May 29, 1923.
J. J. BARRY
FISH SCALER
Filed Nov. 21, 1922
1,456,666
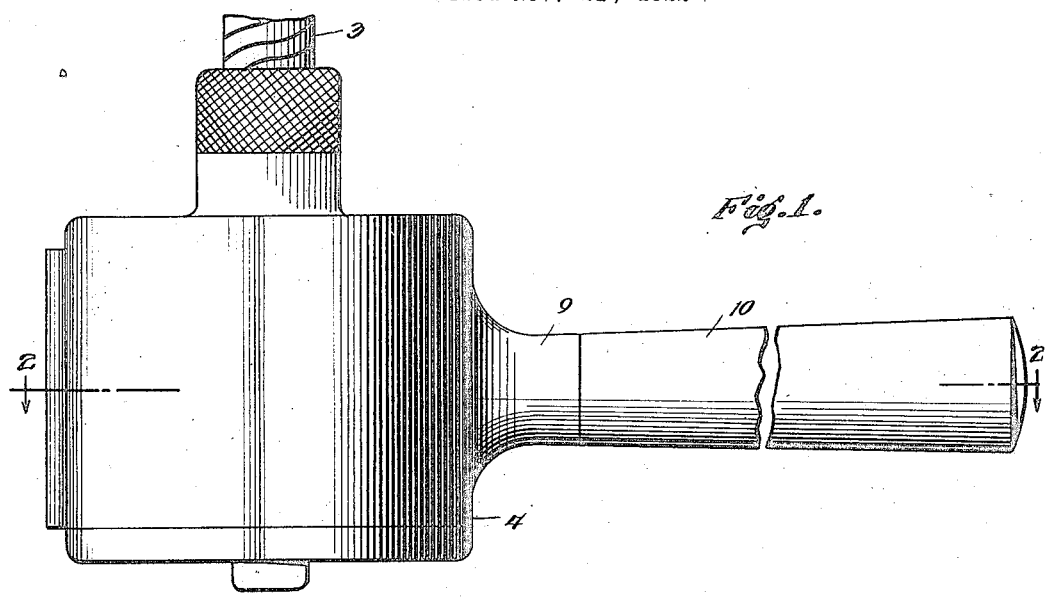
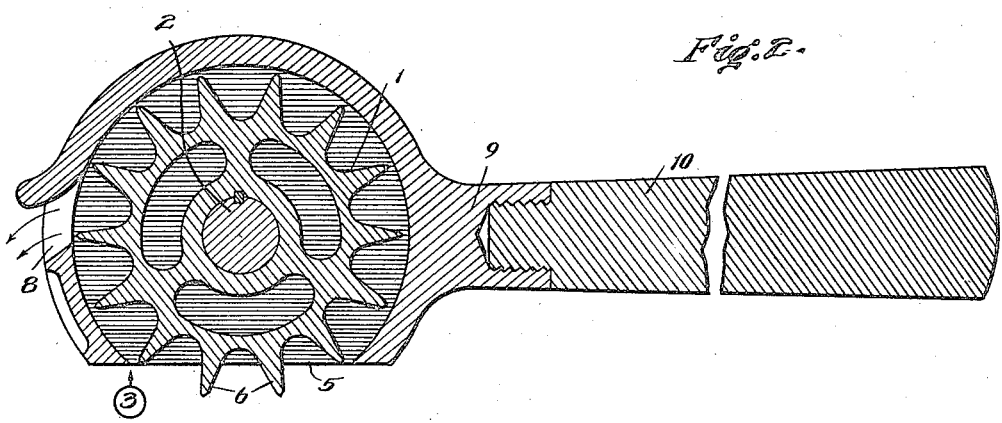
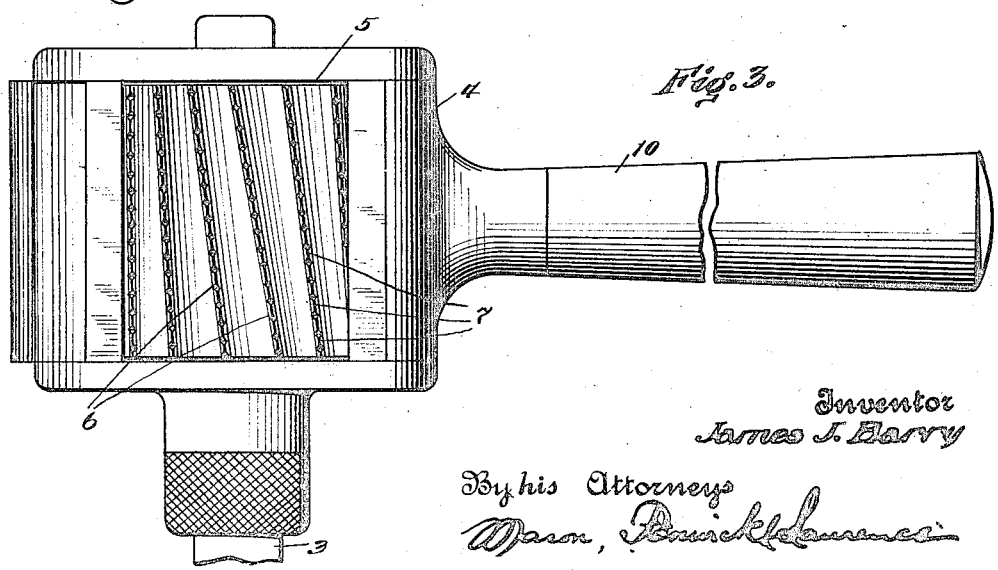
Inventor
James J. Barry
By his Attorneys

UNITED STATES PATENT OFFICE.

JAMES J. BARRY, OF BROOKLYN, NEW YORK.

FISH SCALER.

Application filed November 21, 1922. Serial No. 602,487.

*To all whom it may concern:*

Be it known that I, JAMES J. BARRY, a citizen of the United States, residing at Brooklyn, in the county of Kings and State of New York, have invented certain new and useful Improvements in Fish Scalers; and I do hereby declare the following to be a full, clear, and exact description of the invention, such as will enable others, skilled in the art to which it appertains, to make and use the same.

This invention relates to fish scalers and more particularly to scalers which are power driven.

The objects of the invention are to provide a scaler which will efficiently remove the scales and yet not tear the skin or otherwise injure the fish; to provide a machine delicate enough to remove the scale from small or tender fish and yet strong enough and so constructed to remove the scale from larger fish and fish with more adhering scales; to provide rotary teeth which will cut in under the scales for lifting them off; to prevent the toothed wheel from becoming clogged; to secure simplicity of construction and operation and obtain other advantages and results as may be brought out in the following description.

Referring to the accompanying drawing in which like numerals of reference indicate similar parts throughout the several views;

Figure 1 is a plan of my improved scaler;

Figure 2 is an longitudinal section on line 2—2 of Fig. 1, and,

Figure 3 is an underneath view of the scaler looking in the direction of arrow applied to Fig. 2.

In the specific embodiment of the invention illustrated in said drawing, the reference numeral 1 indicates a toothed wheel carried upon a shaft 2 within a housing 4. The shaft 2 is suitably connected to a flexible shaft 3 and suitable driving means such as an electric motor, (not shown) will be understood.

The housing 4 is preferably cylindrical, with one portion of the cylindrical surface cut away to provide an opening 5 through which the toothed wheel may partially project. It is to be understood that the part of the cylinder that is cut away leaves a flat portion of the cylinder which comprises the bottom of the device, and the device is run over the fish to be scaled with this bottom portion in engagement with the fish so the projecting teeth of wheel 1 will operate upon the scales. The parts are proportioned in such manner that the teeth 6 project only far enough to get in under the scales and remove the same without injury to the fish otherwise, and the teeth are deep enough to accommodate the scales as they are removed, and not clog the teeth while in engagement with the fish.

In order to more positively engage the scales of the fish and obtain a proper action thereon to remove them, the teeth are preferably divided longitudinally of the wheel so as to constitute a plurality of teeth sections 7. The division between the sections of the teeth is preferably on a helical or advancing line around the cylinder, the same having very much the apperance of screw threads. In this way, the teeth are more or less staggered with respect to each other and obviously if one tooth is not in proper position to engage a particular scale, the next tooth is a little further along and will engage the scale to lift it. The division between the sections thus gives additional corners for engagement with the scales and consequently will greatly increase the rapidity with which the scales are removed.

As one of the important features of the present invention, the teeth 6 are arranged or cut spirally across the wheel 1, that is, the teeth do not extend parallel to the axis, but advance a way peripherally. I find by this construction of teeth, that the same do not cut or tear the fish with the wheel rotating. In using wheels with the teeth straight across instead of spiral, the fish is torn by the operation of the wheel especially when the device is not moved quickly enough.

The cylindrical housing 3 preferably has an opening 8 extending longitudinally thereof through which the removed scales may be ejected. In the present disclosure the housing is shown with this opening 8 at one side thereof and a handle socket 9 diametrically opposite therefrom, a suitable handle 10 being screwed into said socket or otherwise carried thereby.

Obviously detail changes and modifications may be made in the construction and use of my improved fish scaler, and I do not wish to be understood as limiting myself to the exact structure shown except as set forth in the following claims when construed in the light of the prior art.

Having thus described my invention, I claim.

1. A device of the character described comprising a housing, a tooth-wheel in said housing adapted to engage and remove scales from a fish, said housing having a separate opening for ejecting the scales.

2. In a device of the character described, a wheel having teeth extending spirally across its surface, said teeth being divided longitudinally of the wheel.

3. In a device of the character described, a wheel having teeth extending spirally across its surface, the teeth being longitudinally divided at varying distances from the end of the wheel.

4. In a device of the character described, a wheel having teeth, the teeth extending spirally across the wheel and being longitudinally divided on a helical line with respect to said wheel.

In testimony whereof I affixed my signature this 29th day of November 1922.

JAMES J. BARRY.